(12) United States Patent
Bennett

(10) Patent No.: US 8,061,211 B1
(45) Date of Patent: Nov. 22, 2011

(54) SEAL WITH INTEGRATED SENSOR

(75) Inventor: Barton E. Bennett, Mishawaka, IN (US)

(73) Assignee: Odyssian Technology, LLC, South Bend, IN (US)

( * ) Notice: Subject to any disclaimer, the term of this patent is extended or adjusted under 35 U.S.C. 154(b) by 0 days.

(21) Appl. No.: 12/456,606

(22) Filed: Jun. 19, 2009

(51) Int. Cl.
*G01L 7/00* (2006.01)
(52) U.S. Cl. .......................................... 73/706
(58) Field of Classification Search .............. None
See application file for complete search history.

(56) References Cited

U.S. PATENT DOCUMENTS

| | | | |
|---|---|---|---|
| 3,789,297 | A | 1/1974 | Frolich |
| 4,677,373 | A | 6/1987 | Kobayashi et al. |
| 6,257,332 | B1 | 7/2001 | Vidrine et al. |
| 6,826,948 | B1 | 12/2004 | Bhatti et al. |
| 7,316,154 | B1 | 1/2008 | Bennett |
| 2003/0042688 | A1 | 3/2003 | Davie et al. |
| 2008/0314118 | A1* | 12/2008 | Bey et al. ............ 73/29.02 |

FOREIGN PATENT DOCUMENTS

| | | |
|---|---|---|
| DE | 4436224 C1 | 3/1996 |
| DE | 19518011 A1 | 11/1996 |
| DE | 10305110 B3 | 8/2004 |
| DE | 10314924 A1 | 11/2004 |
| EP | 0391580 A2 | 10/1990 |
| EP | 0691488 A1 | 1/1996 |
| EP | 1674769 A1 | 6/2006 |
| WO | WO 0223070 A1 | 3/2002 |
| WO | WO 03027561 A1 | 4/2003 |

* cited by examiner

*Primary Examiner* — Andre Allen
(74) *Attorney, Agent, or Firm* — Baker & Daniels LLP

(57) ABSTRACT

In one embodiment of the invention, a seal device is provided with an integrated sensor including: a seal member, having at least two sealing contact surfaces and a sensing member, wherein the sensing member detects the pressure on the seal member in at least one location from a seal formed from at least one of the sealing contact surfaces and a member against which the sealing contact surface is sealed. The seal member can include conductive particles, and the conductivity of the seal member may increase under an increase in pressure. The sensing member can also include a capacitive element the capacitance of which varies under pressure.

34 Claims, 10 Drawing Sheets

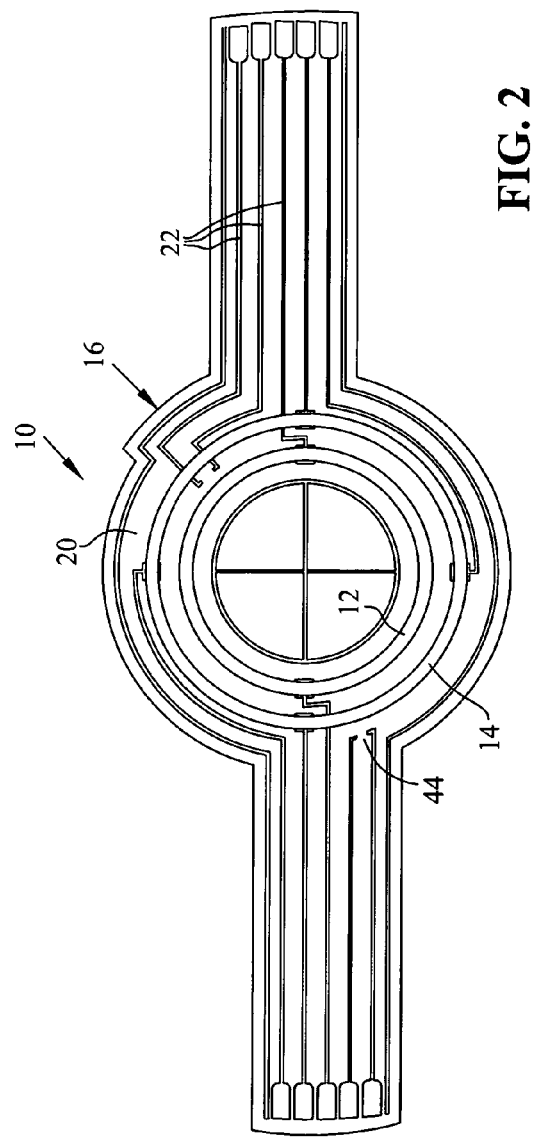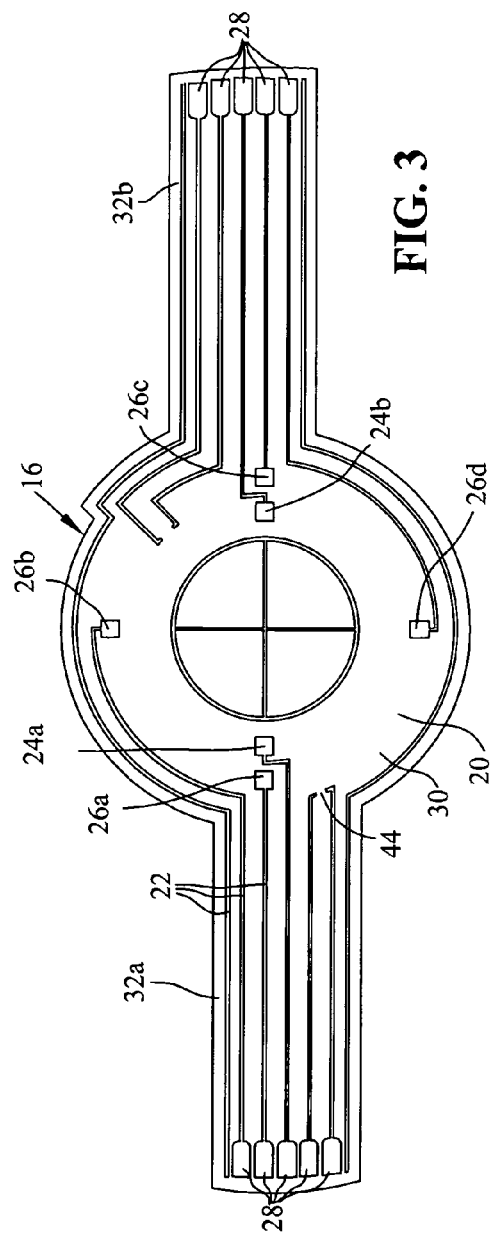
FIG. 2
FIG. 3

SEAL WITH INTEGRATED SENSOR

BACKGROUND OF THE INVENTION

The present invention pertains to a compressible sealing ring, and in particular, to a compressible sealing ring which functions as a pressure sensor.

Fluid seals are made of a variety of materials and have a multitude of design configurations that include, but are not limited to, (i) a circular conformable elastomer O-ring seated in a channel (gland) of a metallic or plastic fitting, (ii) circular washer made of soft conformable metallic or plastic material, (iii) flat gasket of various flat patterns made with conformable fibrous, cellulous, particulate, or polymeric material, (iv) circular compression fittings with off-set tapered mating surfaces, (v) circular flared fittings with conformable flared tubings, and (vi) circular threaded pipe fittings with off-set tapers, etc.

It is known that sealing using conformable materials is achieved when such material is placed between relatively rigid mating surfaces and that sealing occurs when the material is put under pressure and displaces to conform to and fill the space between the mating surfaces.

It is also known that sealing of relatively rigid mating surfaces is achieved when such surfaces are in full or partial and often tight contact. Examples of such sealing are compression fittings and threaded pipefittings that often have tapered mating surfaces that are offset to create tight contact during rotational tightening.

It would be advantageous, however, to be able to determine the pressure that the seal is under, and in particular, to determine any pressure variance around the course of the seal. This could be used to determine if the seal member is unseated, seated properly and evenly, and tightened under the appropriate torque. In addition, it would be advantageous to be able to sense the contained fluid pressure being exerted onto the seal to ascertain if a leak path has been initiated therethrough.

Most pressure sensors, however, function by converting mechanical movement of a diaphragm to an electrical change in resistance or capacitance. This is achieved through the use of active materials like piezo film. However, such sensors are fairly costly, and in addition, it would be difficult to use such sensors to determine if a seal is under uniform pressure and seated properly. Accordingly, it is an object of the present invention to provide a seal member having both sealing and sensing functionality that is capable of sealing and determining if the seal is under proper compression or torque load, and that is also capable of sensing contained fluid pressure and pressure variation indicating leakage across the sealing member.

BRIEF SUMMARY OF THE INVENTION

In one embodiment of the invention, a seal device is provided with an integrated sensor including: a seal member, having at least two sealing contact surfaces and a sensing member, wherein the sensing member detects the pressure on the seal member in at least one location from a seal formed from at least one of the sealing contact surfaces and a member against which the sealing contact surface is sealed.

The seal member can include conductive particles, and the conductivity of the seal member may increase under an increase in pressure.

The sealing device can further include flexible circuitry, and the flexible circuitry can include at least one conductor in electrical contact with the seal member. The flexible circuitry can also include multiple conductors to measure the conductivity in the seal member at different locations.

The sealing device can further include rigid circuitry, and the rigid circuitry can include at least one conductor in electrical contact with the seal member. The rigid circuitry can also include multiple conductors to measure the conductivity in the seal member at different locations. The substrate or support structure of the rigid circuitry may be made of FR4, ceramic, or any other printed circuit board substrate material of known art.

In one embodiment, the seal device includes at least two seal members. The rigid or flexible circuitry may include at least two conductors in contact with one of the seal members, and at least four conductors in electrical contact with the other seal member. The seal members can be concentric with one another other, and the inner seal member and at least two conductors can be used to provide a measurement of the internal pressure acting along the inner seal member. The conductors can be spaced equally about the respective seal member. The seal member and circuitry can function as a resistive Wheatstone bridge with the four quarter sections of the seal member in contact with four conductors functioning as the resistors of the Wheatstone bridge. When a voltage source is applied to the four conductors, the voltage output of the Wheatstone bridge is approximately zero when the sealing compressive force normal to the sealing surface is evenly distributed about the respective seal member. A positive or negative output voltage of the Wheatstone bridge indicates that the sealing compressive force on the seal member is uneven, and the positive or negative voltage output can be used to determine the location of the unevenly applied sealing force or bolt torque load.

The seal device can further include a temperature sensor to provide temperature compensation to the pressure sensing member. The seal member can be formed from an electrically conductive elastomer, and the temperature sensor can be formed from the same elastomer or other temperature measuring device of known art. The temperature sensor can be mounted to flexible circuitry, and the flexible circuitry may include a conductor to provide electrical contact with the temperature sensor. The temperature sensing material or device may be located in the inner fluid containment space to measure temperature of the contained fluid or may be located near the outside surface of the inner sealing component to measure temperature of the sealing member. Temperature measurements of the sealing member may be used to provide temperature compensation.

The seal device may include multiple small or micro sensors located to measure the state of the fluid containment system. In one embodiment, a micro electro mechanical system (MEMS) pressure sensor of device of known art and a small temperature sensor of known art are positioned inside the inner sealing member to measure the pressure and temperature of the contained fluid. The sealing system having integrated sensors inside the inner seal member may be used for the sealing of multiple fittings within a fluid containment system and for providing distributed measurement of the state-of-the-system. Sensors integrated into the fluid containment system may include a multitude of sensors of known art including but not limited to MEMS pressure sensors, thin film thermal couples, temperature sensors, vibration sensors, strain sensors, etc.

The seal member can be formed from an electrically conductive elastomer, and the temperature sensor can be formed from the same elastomer or other temperature measuring device of known art. The temperature sensor can be mounted to flexible circuitry, and the flexible circuitry may include a conductor to provide electrical contact with the temperature sensor. The temperature sensing material or device may be located in the inner fluid containment space to measure temperature of the contained fluid or may be located near the outside surface of the inner sealing component to measure temperature of the sealing member. Temperature measurements of the sealing member may be used to provide temperature compensation.

In one embodiment, the sensing member can include a capacitive element, and the capacitive element can include a compressible dielectric material located between conductive capacitor plates. The capacitive element can be embedded in a compressible dielectric portion of the seal member. The sensing member may include conductive particles embedded therein, and the sensing member may be embedded within a dielectric portion of the seal member. The seal device may further include circuitry embedded in the dielectric portion and in electrical contact with the sensing member. The seal device may also include a plurality of conductors in electrical contact with the sensing member, and the conductors can be spaced equally about the sensing member.

The seal device can also include a pair of contacting rings located on opposite sides of the seal member. The contacting rings may include electric conductors in electrical contact with the sensing member.

In another embodiment of the invention a method of providing a seal device with an integrated sensor is provided including the steps of providing a seal member having at least one sealing contact surface and a sensing member; providing a fluid carrying member having at least one sealing contact surface; forming a seal between the sealing contact surface on the seal member and the fluid carrying member; providing electric circuitry with electrical conductors in contact with the sensing member; and sensing pressure by monitoring electrical properties of the sensing member through the conductors and the electric circuit.

The seal member can include conductive particles, and the conductivity of the seal member increases under an increase in pressure. The electric circuitry can be mounted on a flexible element. The electric circuitry may also include at least four conductors and the conductors are in electrical contact with the seal member. The seal member and the electric circuitry can function as a resistant Wheatstone bridge with four quarter sections of the seal member in contact with the four conductors functioning as resistors of the Wheatstone bridge. The method may further include the steps of applying a voltage to the four conductors, monitoring the voltage output of the Wheatstone bridge, and detecting an approximately zero output voltage when the pressure is evenly distributed about the seal member. The method may further include the step of reading a positive or negative output voltage of the Wheatstone bridge when pressure on the seal member is uneven, and the voltage output is positive or negative, depending on the location of the unevenly applied pressure.

In one embodiment, the method can further include the steps of providing a temperature sensor and providing temperature compensation to the pressure sensing member based upon the sensed temperature.

In one embodiment, the sensing member includes a capacitive element, and the capacitive element includes a compressible dielectric material located between conductor capacitor plates.

The method may further include the steps of providing a second seal member and at least two conductors in contact with the second seal member, and measuring the internal pressure acting along the second seal member.

In another embodiment of the invention, a method for measuring changes in a fluid pressure is provided including the steps of providing a flex circuitry having a flexible film with conductive traces thereon; providing a sensing member including an elastomeric polymer and conductive particles embedded in the polymer; mounting the sensing member on the flex circuitry with the sensing member in electrical contact with the conductive traces; and measuring the change in electrical resistivity of the sensing member based upon changes in applied pressure.

The fluid can be air, and the method may further include the step of providing at least one layer surrounding the sensing member. One layer of polyimide film can be provided around the sensing member and a second layer of polyimide film can be provided over the top of the sensing member.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 2 is a plan view of the conductive O-ring seal with integrated flex circuitry of FIG. 1;

FIG. 3 is a plan view of the flex circuitry of FIG. 1 with the conductive rings removed;

Figure 1:
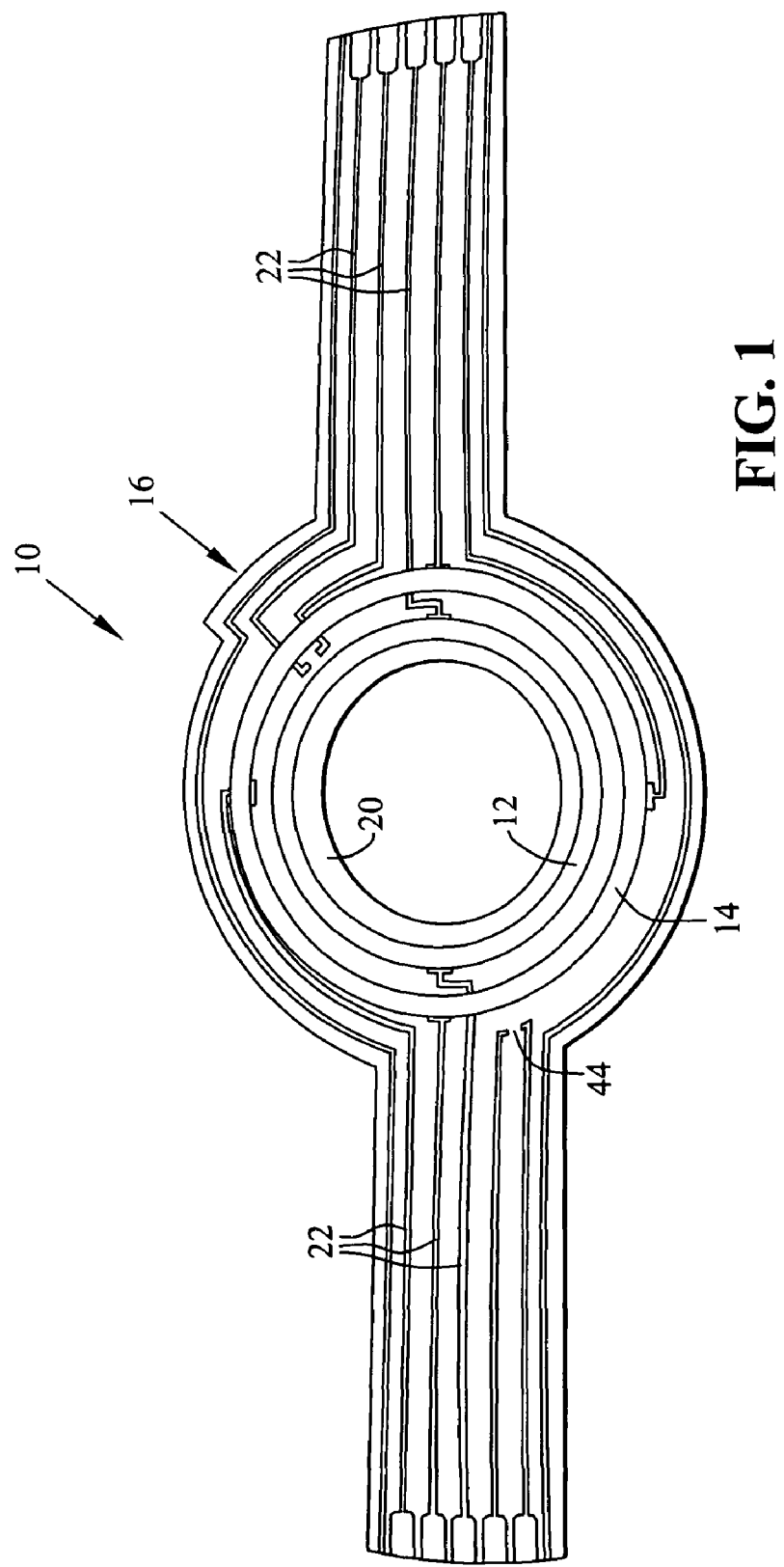
FIG. 1 is a perspective view of a first embodiment of a conductive seal with integrated flex circuitry.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Now referring to FIGS. 1-3, an embodiment of a seal device in accordance with the present invention is shown, generally indicated as 10. Seal device 10 includes a pair of seal/sensing members 12 and 14 and a flex circuitry, generally, indicated as 16. In the embodiment shown, seal members 12 and 14 have the configuration of an O-ring made of an elastomeric material, cellulose, or other compressible sealing material of known art. It should be appreciated, however, that seal members 12 and 14 may take on any desirable sealing configuration including washers, grommets, head gaskets or other gaskets, or fittings (as may any of the embodiments herein). The seal members may also be made from a single piece of flexible member or may include a laminated design consisting of a compliant seal mounted on a more rigid backing plate or member.

Also, in the embodiment shown, sensing members 12 and 14 are configured as two concentric O-rings. Furthermore, in this embodiment, electrically conducted or chemically reactive particulates are formed in seal members 12 and 14. The conductive particulates can include small particles of any electrically conductive material, such as copper, aluminum, silver, gold, carbon, or carbon nano materials. It should be further appreciated that the elastomer, cellulose, or other material used for serial members 12 and 14 are generally dielectric (have a low conductivity) and preferably the conductive particles have some spacing therebetween which consists of the compressible dielectric material.

As best shown in FIG. 3, flex circuitry 16 includes a flex substrate 20, conductive traces 22, conductors 24a-24b, conductors 26a-26d, and contactors 28. Flex substrate 20 may be made from any flex material known in the art for use in electrical applications, such as a polyimide film. In the embodiment in FIGS. 1-3, flex substrate 20 includes a central portion 30, where conductors 24a-24b and 26a-26d and seal members 12 and 14 are located, and flex substrate 20 also includes extensions 32a-32b, where contactors 28 are located.

Conductive traces 22, conductors 24a-24b, conductors 26a-26d, and contactors 28 may be applied with any known method including, but not limited to, using electrically conductive foils, printed conductive inks or compounds, or vapor metal deposition. In particular, one method of making these electrically conductive elements is using negative dry-film resist techniques. For this method, a drawing is created of the electrically conductive elements, and then a negative of those elements is printed onto a clear film. A copper-clad substrate is laminated with the negative dry-film resist (in a dark room), the negative image on clean film is placed on top of the laminated substrate, and then it is exposed to a light source to develop. It is then removed from the light source and placed in a negative developer solution to remove all but the electrically conductive elements. The film is then placed in an etching solution to remove all copper around the tracings, and the remaining resist is removed in another solution.

As can be seen in FIG. 3, conductive traces 22 extend between contactors 28 on the ends of extensions 32a and 32b and conductors 24a-24b/conductors 26a-26d. Conductors 24a and 24b are located closer to the center of central portion 30 of flex substrate 20 than conductors 26a-26d and at the same radial distance from the center of the substrate for reasons discussed below. Conductors 24a and 24b are also located approximately 180 degrees away from one another and are connected to a different set of conductive traces 22 and contactors 28 than conductors 26a-26d, also for reasons set forth below.

Conductors 26a-26d are also located on central portion 30 of flex substrate 20 and spaced at approximately 90 degrees from one another. Conductors 26a-26d are also all located at approximately the same radial distance form the center of substrate 20, and each is connected to a different conductive trace 22 and contactor 28.

Seal device 10 is assembled in the configuration shown in FIGS. 1 and 2 with seal members 12 and 14 located on central portion 30 of flex substrate 20. Furthermore, seal member 12 is located on and in electrical contact with conductors 24a and 24b, and seal member 14 is located generally concentric with and around seal member 12 and on and in electrical contact with conductors 26a-26d. It should also be appreciated that a nonconductive coating or other known method is used to prevent seal member 14 from having electrical contact with the conductive traces 22 connected to conductors 24a and 24b as seal member 14 intersects with these traces. Seal members 12 and 14 can be adhered to flex substrate 20 using an adhesive or other known suitable attachment methods. It should also be appreciated that a mirror image or another design of flex circuitry may be placed on the opposite side of flex substrate 20 along with another set of appropriately sized seal members, and/or a second flex circuitry 16 may be placed on the opposite faces of seal members 12 and 14, thereby sandwiching the seal members between the flex circuitry.

In operation, the outer seal member 14, conductors 26a-26d, and associated circuitry function as a bolt load sensor to measure the distribution of pressure across the circumference of the seal device in this embodiment, while the inner seal member 12, conductors 24a and 24b, and associated circuitry can be used to measure the internal pressure acting along the inner O-ring 12 circumference.

Figure 8:
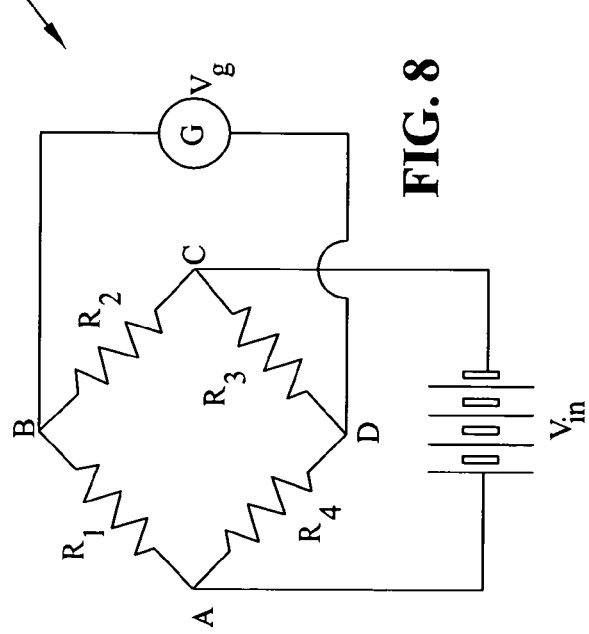
FIG. 8 is a schematic diagram of a Wheatstone bridge for use with this invention.

Seal member 14 can be used to measure the pressure distribution as it functions as a Wheatstone bridge 34 (see FIG. 8), with the four resistors represented by the four quarter sections of seal member 14 measured through the thickness and extending between respective conductors 26a-26d. As a section is compressed, the distance between the conductive particles (separated by the dielectric elastomer sensor-seal material) shrinks, and resistance goes down. Likewise, when a section is depressed, the resistance goes up. This technology allows one to measure and quantify the bolt load pressure exerted on seal member 14 in order to know whether it is unseated, seated unevenly, or inadequately fastened (due to too low of bolt or fitting torque).

When a voltage source is applied to contactors 28, seal device 10 will output a voltage which shows the degree to which pressure is evenly distributed across all four sections of seal member 14 to determine if the seal device is properly seated. When the pressure is evenly distributed, the voltage is around zero. But when the pressure becomes uneven, the voltage changes, either positive or negative, depending on the location of the unevenly applied pressure. Also, seal device 10 can be used to monitor pressure changes over time and a change may indicate the start of a leak in the seal.

It should also be appreciated that the range of resistance and electrical characteristics can be manipulated by changing the amount of conductive filler and varying the spaces between conductors 26a 26b as this will affect the resistance of each section. It should also be appreciated that the coefficient of thermal expansion/temperature and humidity can have a direct effect on the resistance readings and may require compensation before a pressure measurement can be accurately made. Conductors 44 are provided on flexible circuitry 16 for electrical connection to a sensor (not shown in this embodiment); however, a temperature sensor is provided in the next embodiment to provide a temperature reading to make the necessary compensation.

Figures 4, 5:
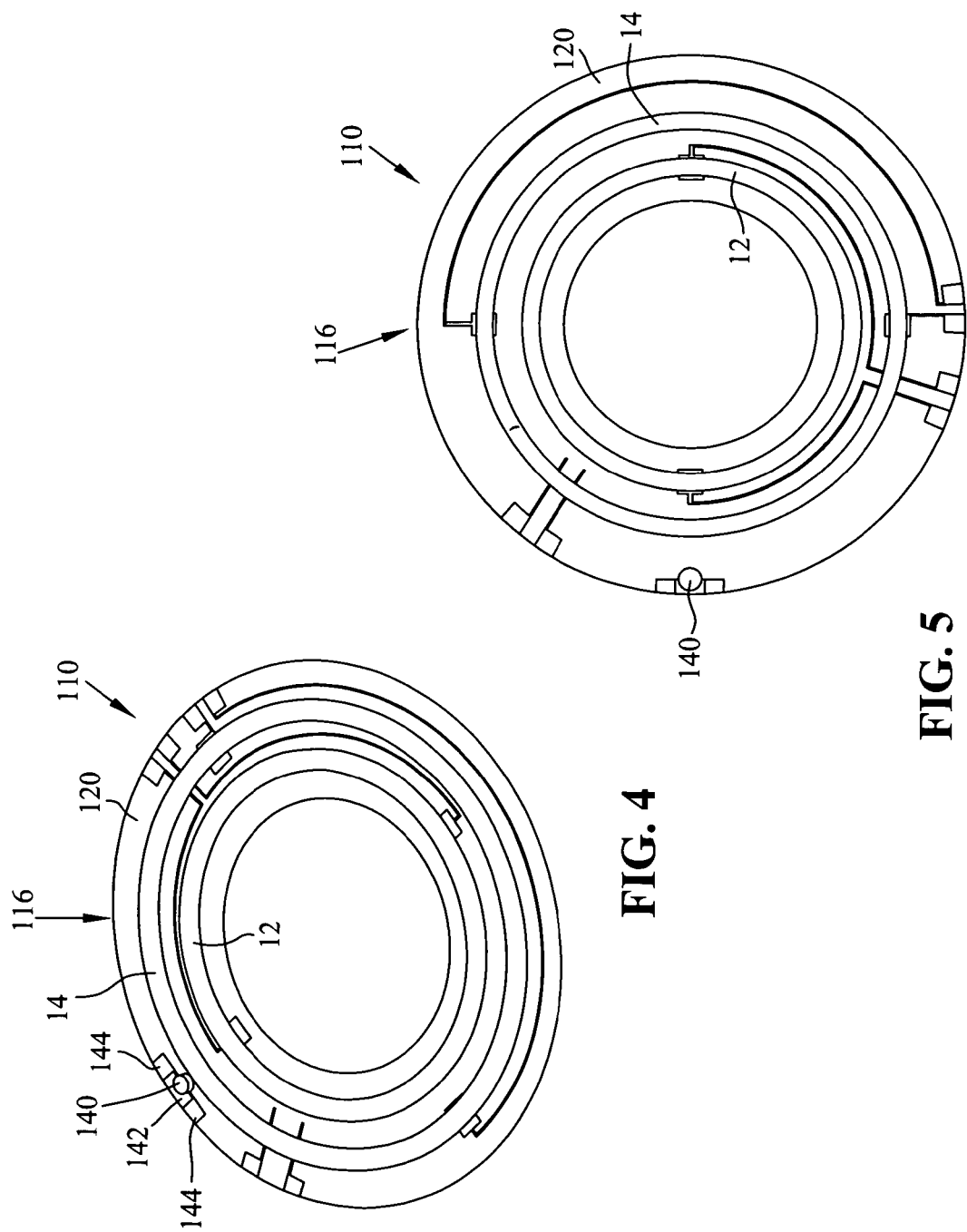
FIG. 4 is a perspective view of another embodiment of a conductive seal with integrated flex circuitry.
FIG. 5 is a plan view of the embodiment of the conductive O-ring seal with integrated flex circuitry of FIG. 4.
Figure 6:
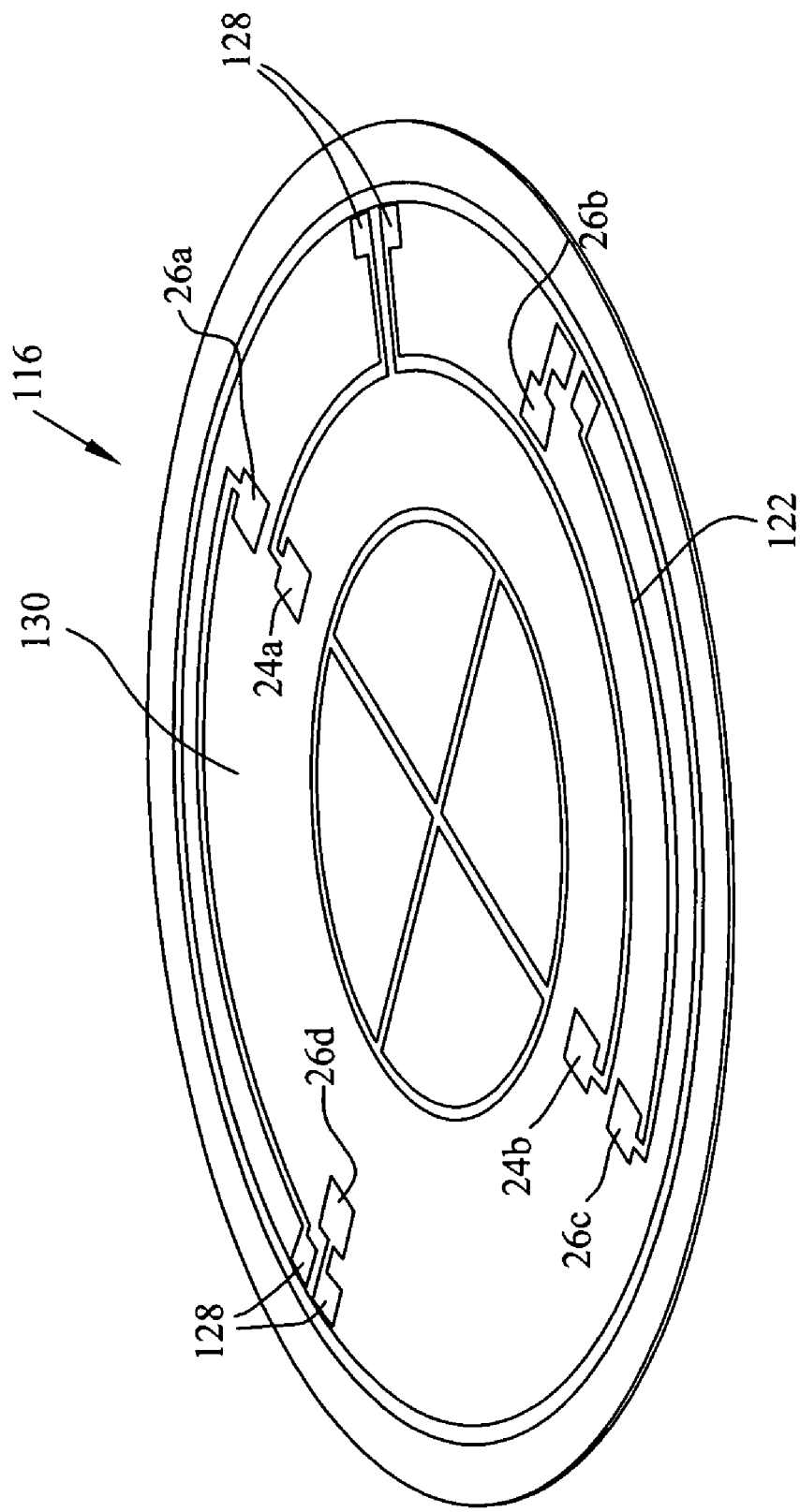
FIG. 6 is a perspective view of the integrated flex circuitry of FIG. 4 with the seal removed.

Now referring to FIGS. 4-6, another embodiment of a seal device in accordance with the subject invention is shown, generally indicated as 110. Seal device 110 is similar to seal device 10 in most respects except that seal device 110 includes an alternate embodiment flex circuitry 116. Flex circuitry 116 differs from flex circuitry 16 in that it includes a flex substrate 120 that has a generally circular configuration without extensions 32a and 32b. Accordingly, flex circuitry 116 includes conductive traces 122 and contactors 128 all confined in a central portion 130 of substrate 120.

In addition, seal device 110 includes a temperature sensor 140, to provide for temperature compensation as discussed above. Conductive traces 142 and contactors 144 are also provided on flex substrate 120 to provide electric circuitry to temperature sensor 140. The temperature sensor can include the same material as the seal rings in order to be able to directly correlate resistance changes based on a change in temperature. It should be appreciated that a temperature sensor may be incorporated with any of the seal device embodiments of the present invention.

In operation, seal device 110 functions the same as seal device 10, but also includes the ability to compensate for changes in temperature. It should be noted that the change in resistance based upon temperature can be high, but predictable, and consistent results can be obtained, thereby allowing for temperature compensation through the use of algorithms in the sensor control processor (not shown). It is believed that humidity has little effect on the sensor because the active material is effectively sealed within the device.

Figure 7:
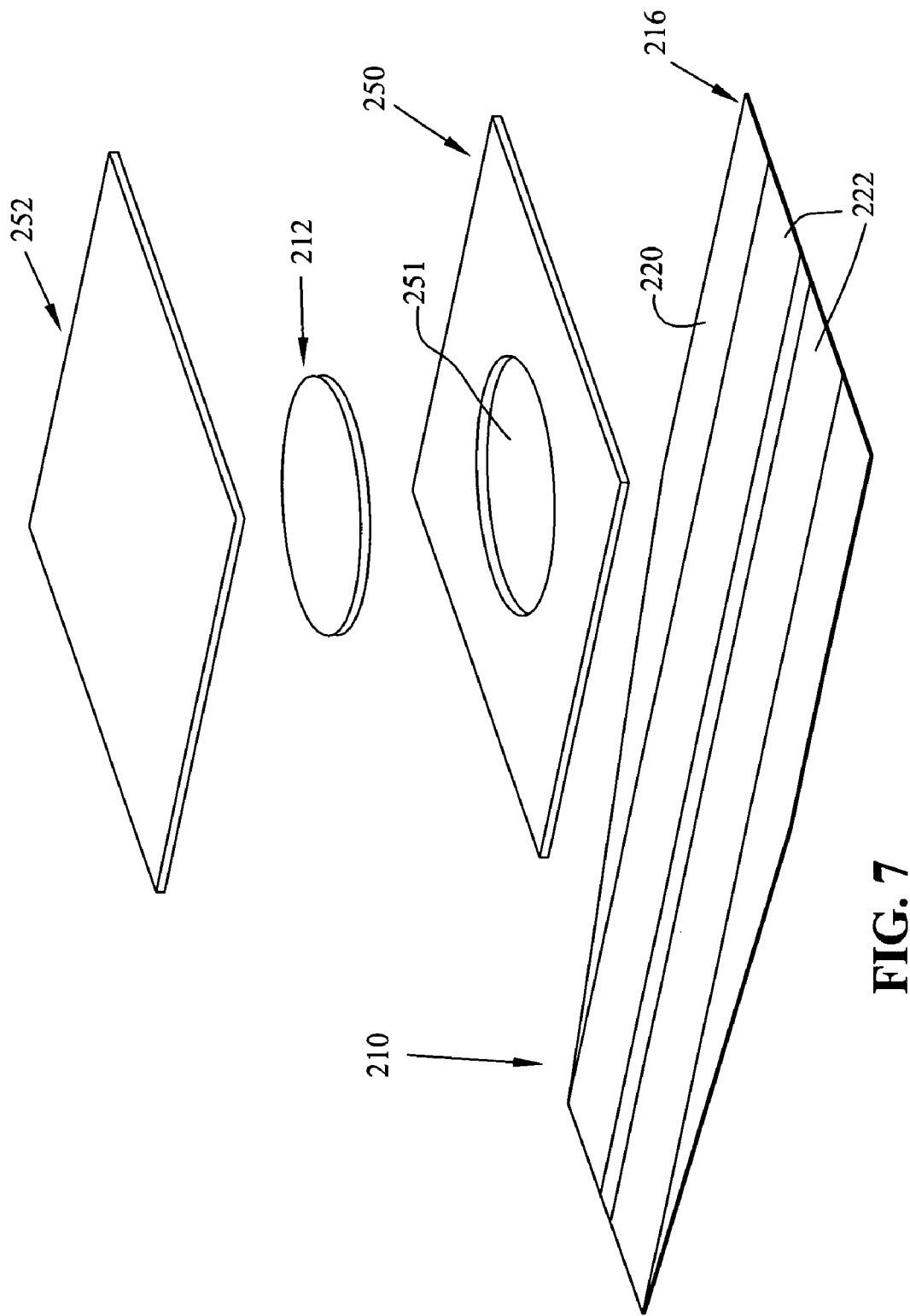
FIG. 7 is an exploded perspective view of the layers of an elastomer sensor.

Now referring to FIG. 7, an alternate embodiment pressure sensor is shown, generally indicated as 210. Sensor 210 includes a flex circuitry 216 having a flex substrate 220 and conductive traces 222. As with flex substrate 20, flex substrate 220 may be made from any flex material known in the art for use in electrical applications, such as a polyimide film. Sensor 210 also includes a sensing member 212, which is a conductive elastomer made from a polymer filled with conductive particles the same as seal members 12 and 14. In this embodiment, sensing member 212 has a disc shaped configuration, but it should be appreciated that any desired configuration could be employed that will generally convert pressure to a force applied in one plane only.

Sensor 210 also includes a layer 250 surrounding sensing member 212 and including an opening 251 sized to accommodate sensing member 212. Sensor 210 also includes a top layer 252 covering and sealing sensing member 212 to flex substrate 220. Layers 250 and 252 may be made from a polyimide film, other compatible elastomer, or other known suitable material.

Sensor 210 operates in a manner similar to sensing member 12 of seal device 10, which also is in contact with two conductors and may be used to measure air pressure among other applications. The configuration employed in sensor 210 makes it behave in a manner similar to a tactile pressure sensor.

Figure 9:
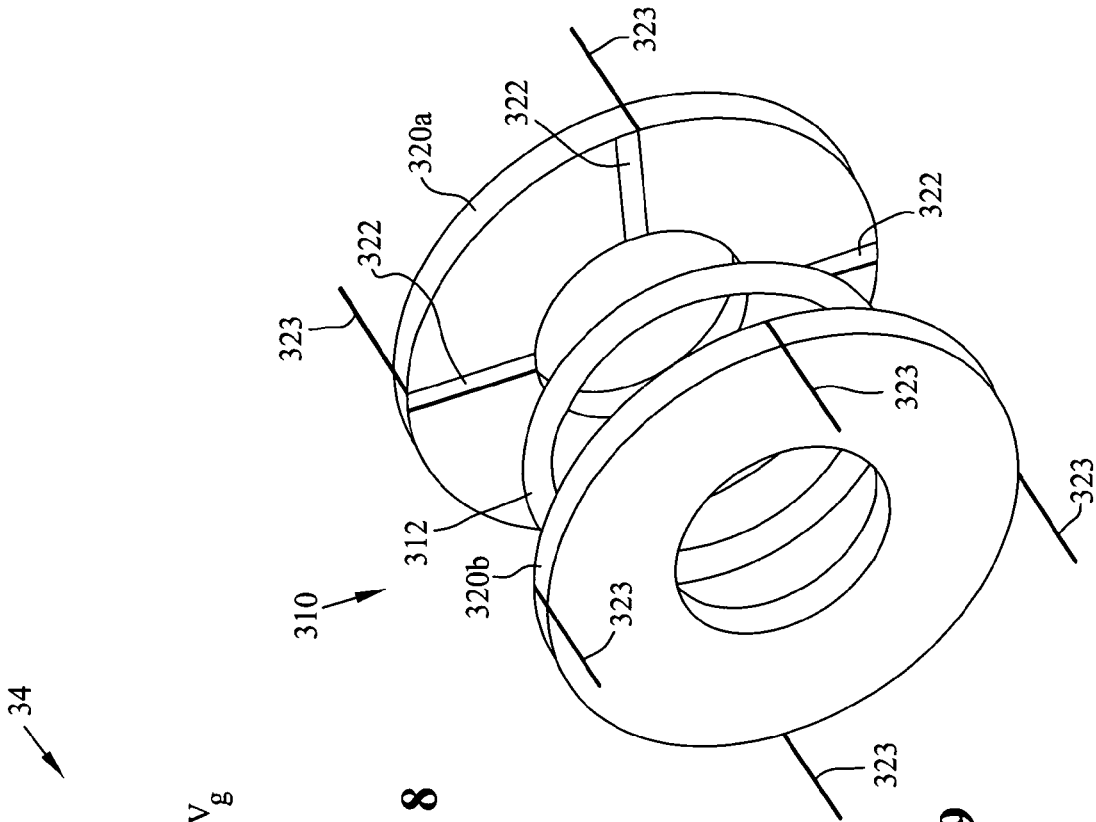
FIG. 9 is an exploded perspective view of a conductive O-ring and contacting rings.

Now referring to FIG. 9, another embodiment of a seal device is shown, generally indicated as 310. Seal device 310 includes a seal member 312, which is similar to seal members 12 and 14, and two contacting plates 320a and 320b. Contacting plates 320a and 320b each include conductive traces 322 on the faces contacting seal member 212 and electrical leads 323 connected to respective conductive traces.

There are four equally spaced conductive traces 322 on each contacting plate 320a and 320b, so as should be appreciated by one skilled in the art, this embodiment will function as a Wheatstone bridge similar to seal member 14.

Figure 10:
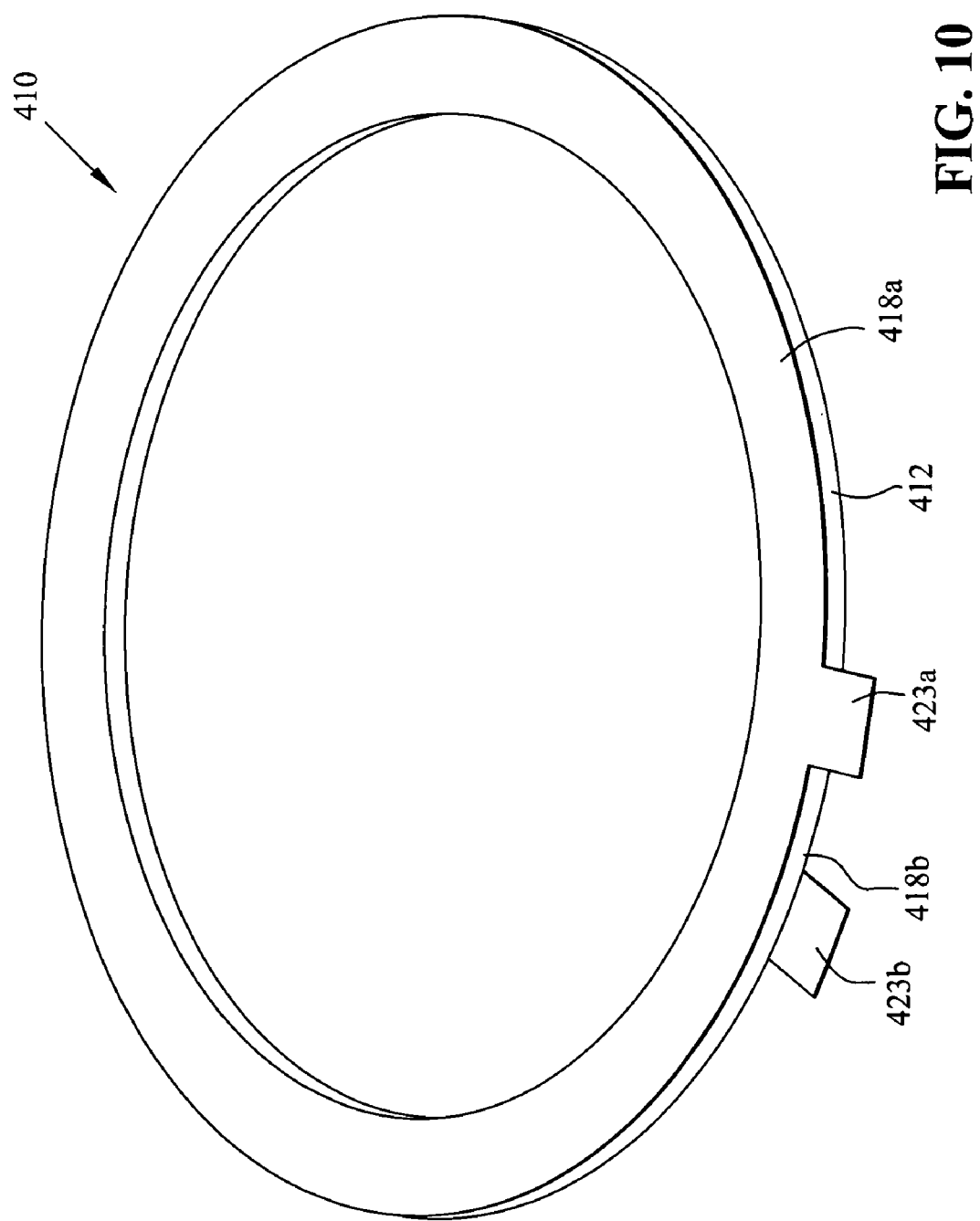
FIG. 10 is a perspective view of a capacitive gasket sensor.

Now referring to FIG. 10, an alternate embodiment pressure sensor is shown, generally indicated as 410. Pressure sensor 410 uses capacitance to measure changes in pressure and includes a compressible dielectric element 412 located between a pair of capacitor plates 418a and 418b, which have respective electrical leads 423a and 423b attached thereto. As should be appreciated based upon the discussion above, the capacitance of sensor 410 will change with pressure as compressible element 412 is compressed or depressed based upon the applied pressure.

Figure 11:
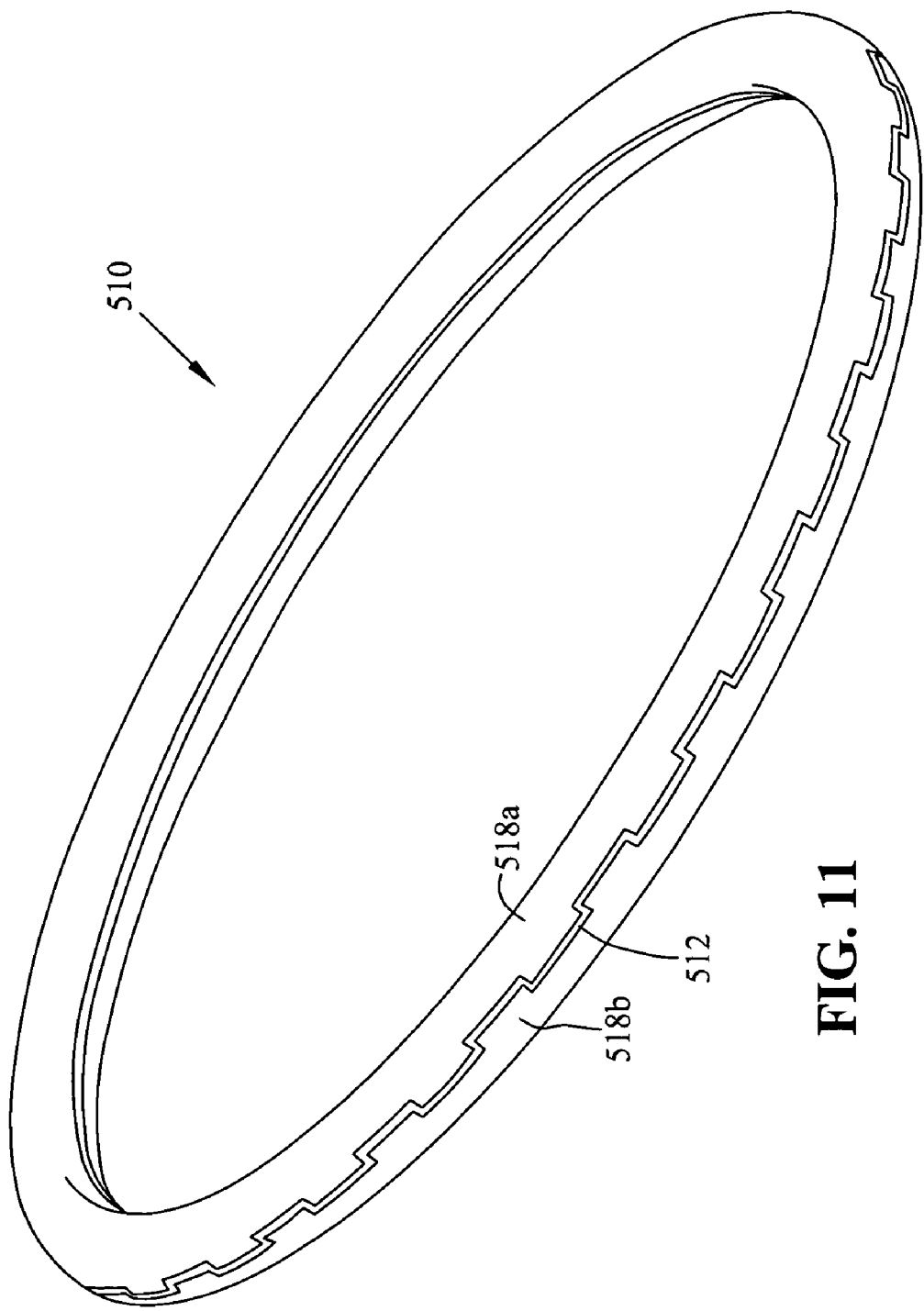
FIG. 11 is a perspective view of an alternate embodiment of a capacitive gasket sensor.

Now referring to FIG. 11, an alternate embodiment pressure sensor is shown, generally indicated as 510. Pressure sensor 510 is similar to sensor 410 and functions in a similar fashion, however, sensor 510 includes a compressible dielectric element 512 and capacitor plates 518a and 518b that form the general configuration of an O-ring. In the embodiment shown, capacitor plates 518a and 518b have uniform inside edges and notched or serrated outside edges.

Figure 12:
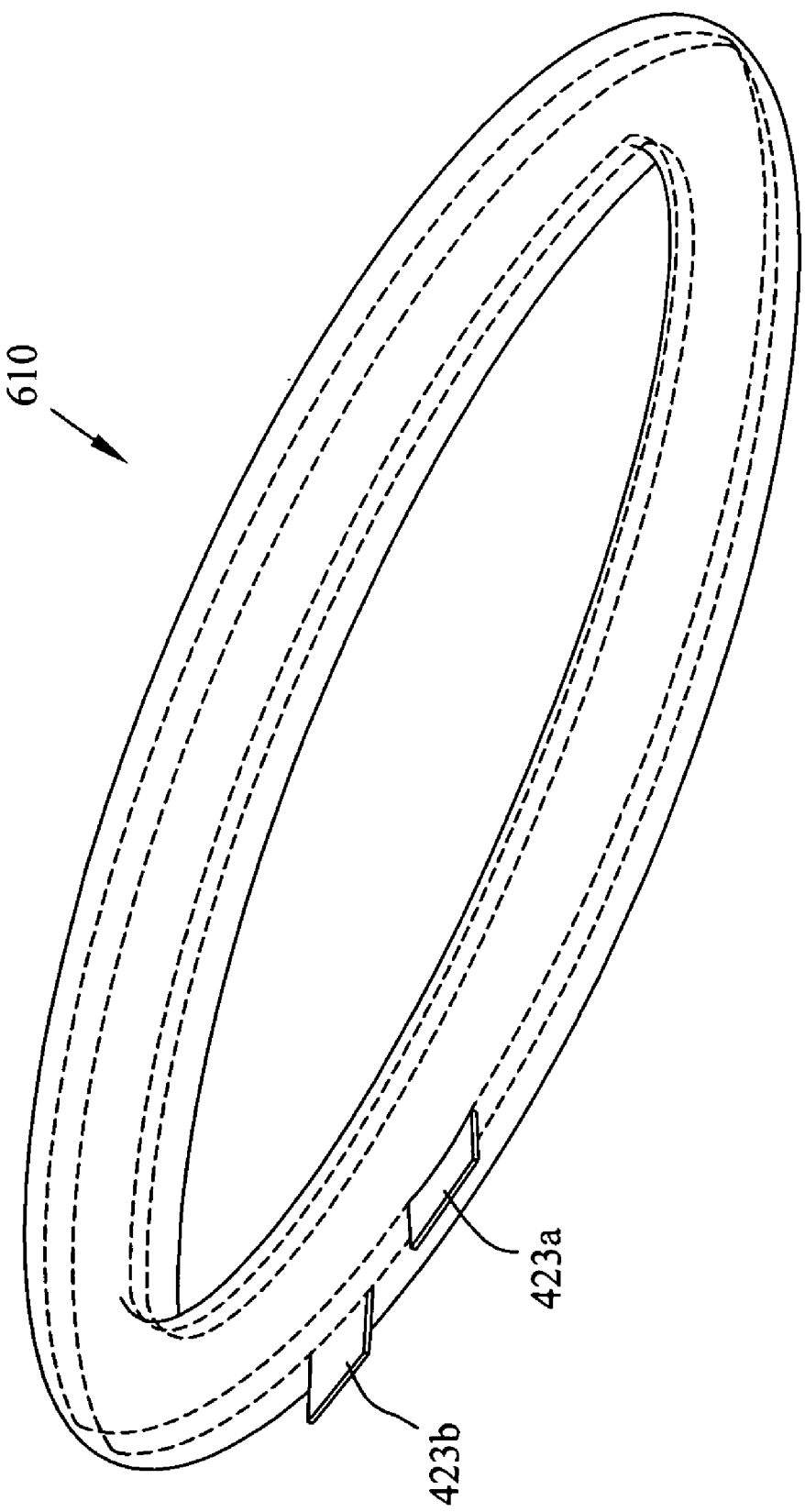
FIG. 12 is a perspective view of a sensing element having an embedded capacitive element.

Now referring to FIG. 12, another pressure sensor embodiment is shown, generally indicated as 610. Sensor 610 is identical to sensor 410, except that it includes a polymer dielectric casing 613 surrounding the capacitor plates, giving the sensor the general configuration of an O-ring with only electrical leads 423a and 423b extending out of casing 613. This embodiment provides electric insulation and corrosion and humidity resistance to the sensor in addition to making it compatible for use in O-ring applications.

Figure 13:
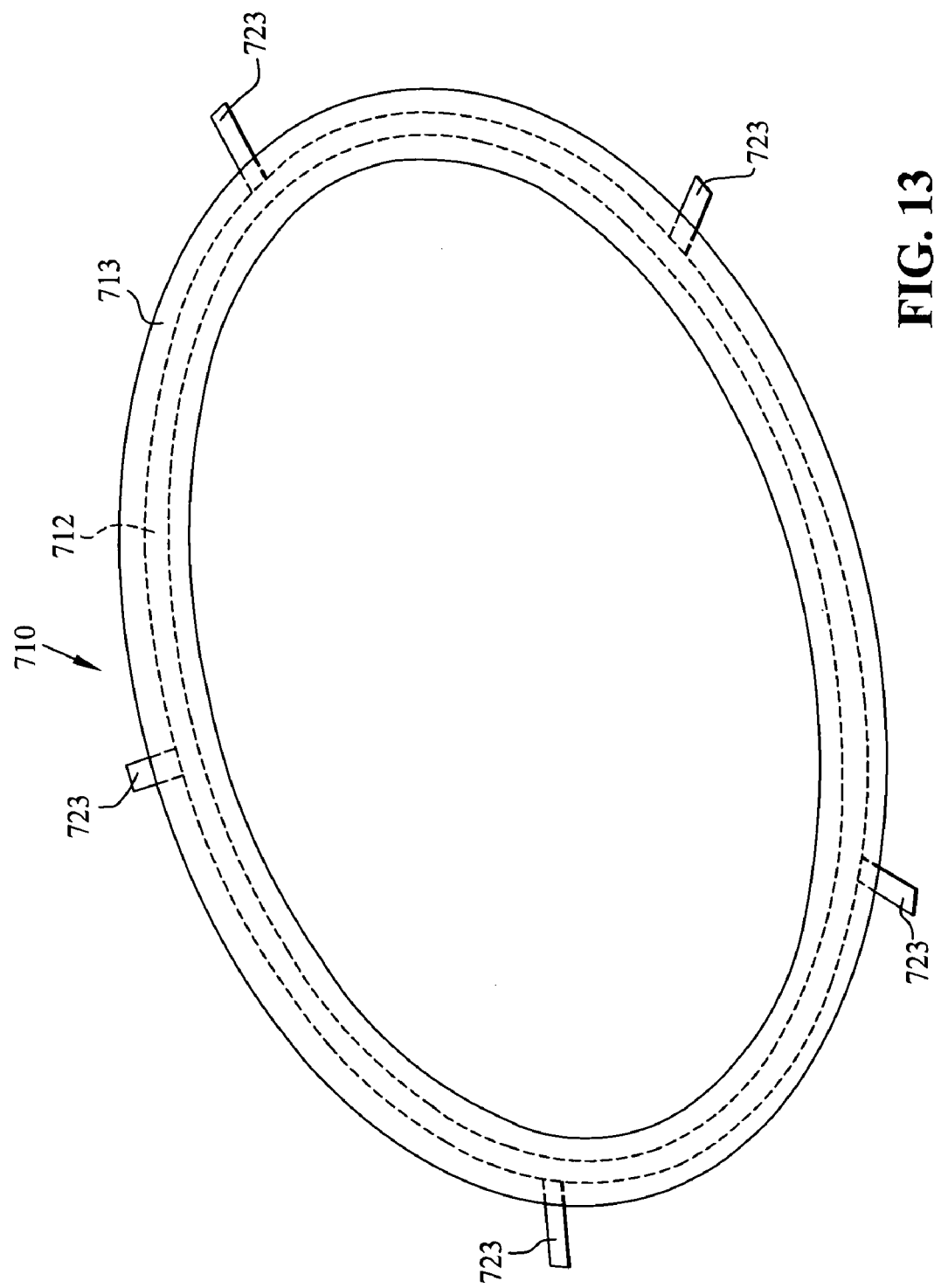
FIG. 13 is a perspective view of a sensing element with embedded circuitry.

Now referring to FIG. 13, another alternate embodiment seal device is shown, generally indicated as 710. Seal device 710 includes a sensing member 712 that is manufactured similar to seal/sensing members 12 and 14. Instead of being attached to a flex film, though, sensing member 712 is encased in a polymer dielectric material 713 to provide electrical insulation and corrosion and humidity resistance with only electrical leads 723 protruding therefrom. Five electrical leads 723 are shown to measure the electrical resistance changes in sensing member 712 due to pressure changes, however, four leads may be used similar with seal member 14 to make seal device 710 function as a Wheatstone Bridge.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. As such, the scope of the invention is indicated by the following claims rather than by the description.

The invention claimed is:

1. A seal device with an integrated pressure sensor comprising:
a seal member, including at least two sealing contact surfaces and a sensing member, said sensing member detecting the pressure on the seal member in at least one location from a seal formed from at least one of said sealing contact surfaces and a member against which said sealing contact surface is sealed, said seal member includes conductive particles, and wherein the conductivity of said seal member increases under an increase in pressure.

2. The seal device as set forth in claim 1, further including a temperature sensor to provide temperature compensation to the pressure sensing member.

3. The seal device as set forth in claim 2, wherein said seal member is formed from an elastomer, and said temperature sensor is formed from the same elastomer.

4. The seal device as set forth in claim 3, wherein said temperature sensor is mounted to flexible circuitry, and said flexible circuitry includes a conductor to provide electrical contact with said temperature sensor.

5. The seal device as set forth in claim 1, wherein said sensing member includes a capacitive element.

6. The seal device as set forth in claim 5, wherein said capacitive element includes a compressible dielectric material located between conductive capacitor plates.

7. The seal device as set forth in claim 6, wherein said capacitive element is embedded in a compressible dielectric portion of said seal member.

8. The seal device as set forth in claim 1, wherein said sensing member includes conductive particles embedded therein, and said sensing member is embedded within a dielectric portion of said seal member.

9. The seal device as set forth in claim 8, further including circuitry embedded in said dielectric portion and in electrical contact with said sensing member.

10. The seal device as set forth in claim 9, including a plurality of conductors in electrical contact with said sensing member.

11. The seal device as set forth in claim 10, wherein said conductors are spaced equally about said sensing member.

12. The seal device as set forth in claim 1, further including a pair of contacting rings located on opposite sides of said seal member.

13. The seal device as set forth in claim 12, wherein said contacting rings include electrical conductors in electrical contact with said sensing member.

14. A seal device with an integrated pressure sensor comprising:
a seal member, including at least two sealing contact surfaces and a sensing member, said sensing member detecting the pressure on the seal member in at least one location from a seal formed from at least one of said sealing contact surfaces and a member against which said sealing contact surface is sealed; and
flexible circuitry, wherein said flexible circuitry includes at least one conductor in electrical contact with said seal member, and said flexible circuitry includes multiple conductors to measure the conductivity in said seal member at different locations.

15. The seal device as set forth in claim 14, including at least two seal members.

16. The seal device as set forth in claim 15, wherein said flexible circuitry includes at least two conductors in contact with one of said seal members, and at least four conductors in electrical contact with said other seal member.

17. The seal device as set forth in claim 16, wherein said seal members are concentric with each other having a common center point, and the inner seal member and two conductors can be used to provide a measurement of the internal pressure acting along the inner seal member.

18. The seal device as set forth in claim 16, wherein said conductors are spaced equally about the respective seal member.

19. The seal device as set forth in claim 18, wherein said seal member and flexible circuitry function as a resistive Wheatstone bridge as the electrical resistance in the seal changes with changes in pressure and the four quarter sections of said seal member in contact with four conductors functioning as the resistors of the Wheatstone bridge.

20. The seal device as set forth in claim 19, wherein when a voltage source is applied to said four conductors, the voltage output of the Wheatstone bridge is approximately zero when the pressure is evenly distributed about the respective seal member.

21. The seal device as set forth in claim 19, wherein a positive or negative output voltage of the Wheatstone bridge indicates the pressure on said seal member is uneven, and whether the voltage output is positive or negative depends on the location of the unevenly applied pressure.

22. A method of providing a seal device with an integrated sensor comprising the steps of:
providing a seal member, including at least one sealing contact surface and a sensing member;
providing a fluid carrying member having at least one sealing contact surface;
forming a seal between said sealing contact surface on said seal member and said fluid carrying member;
providing electric circuitry with electrical conductors in contact with said sensing member;
sensing pressure by monitoring electrical properties of said sensing member through said conductors and said electric circuit; and
wherein said seal member includes conductive particles, and the conductivity of said seal member increases under an increase in pressure.

23. The method of providing a seal device with an integrated sensor as set forth in claim 22, wherein said electric circuitry is mounted on a flexible element.

24. The method of providing a seal device with an integrated sensor as set forth in claim 22, wherein said electric circuitry includes at least four conductors and said conductors are in electrical contact with said seal member.

25. The method of providing a seal device with an integrated sensor as set forth in claim 24, wherein said seal member and said electric circuitry function as a resistant Wheatstone bridge as the electrical resistance in the seal changes in pressure and four quarter sections of said seal member in contact with four conductors functioning as resistors of the Wheatstone bridge.

26. The method of providing a seal device with an integrated sensor as set forth in claim 25, further including the steps of applying a voltage to said four conductors, monitoring the voltage output of the Wheatstone bridge, and detecting an approximately zero output voltage when the pressure is evenly distributed about said seal member.

27. The method of providing a seal device with an integrated sensor as set forth in claim 26, further including the step of reading a positive or negative output voltage of the Wheatstone bridge when pressure on said seal member is uneven, and the voltage output is positive or negative, depending on the location of unevenly applied pressure.

28. The method of providing a seal device with an integrated sensor as set forth in claim 27, further including the steps of providing a second seal member and at least two conductors in contact with said second seal member, and measuring the internal pressure acting along said second seal member.

29. The method of providing a seal device with an integrated sensor as set forth in claim 22, further including the steps of providing a temperature sensor and providing temperature compensation to the pressure sensing member based upon the sensed temperature.

30. The method of providing a seal device with an integrated sensor as set forth in claim 22, wherein said sensing member includes a capacitive element, and said capacitive element includes a compressible dielectric material located between conductor capacitor plates.

31. A method for measuring changes in a fluid pressure comprising the steps of:
provinding a flex circuitry including a flexible film having conductive traces thereon;
providing a sensing member including an elastomeric polymer and conductive particles embedded in the polymer; wherein the conductivity of the sensing member increases under an increase in pressure due to the conductive particles being pushed closer together; and
mounting said sensing member on said flex circuitry with said sensing member in electrical contact with said conductive traces; and
measuring the change in electrical resistivity of said sensing member based upon changes in applied pressure.

32. The method for measuring changes in a fluid pressure as set forth in claim 31, wherein the fluid is air.

33. The method for measuring changes in a fluid pressure as set forth in claim 31, further including the steps of providing at least one layer surrounding said sensing member.

34. The method for measuring changes in a fluid pressure as set forth in claim 33, wherein one layer of polyimide film is provided around said sensing member and a second layer of polyimide film is provided over the top of said sensing member.

* * * * *